(12) United States Patent
Craig

(10) Patent No.: US 11,921,222 B1
(45) Date of Patent: Mar. 5, 2024

(54) INTELLIGENT PLANTING APPARATUS

(71) Applicant: Corey Craig, Auburn, AL (US)

(72) Inventor: Corey Craig, Auburn, AL (US)

( * ) Notice: Subject to any disclaimer, the term of this patent is extended or adjusted under 35 U.S.C. 154(b) by 344 days.

(21) Appl. No.: 17/232,031

(22) Filed: Apr. 15, 2021

(51) Int. Cl.
    *G01S 19/14*     (2010.01)
    *A01B 1/02*     (2006.01)
    *A01C 14/00*     (2006.01)
    *G01S 19/42*     (2010.01)

(52) U.S. Cl.
    CPC .............. *G01S 19/14* (2013.01); *A01B 1/024* (2013.01); *A01C 14/00* (2013.01); *G01S 19/42* (2013.01)

(58) Field of Classification Search
None
See application file for complete search history.

(56) References Cited

U.S. PATENT DOCUMENTS

| | | | | |
|---|---|---|---|---|
| 2013/0067808 A1* | 3/2013 | Stachon | ................... | A01G 7/06 |
| | | | | 702/19 |
| 2014/0303834 A1* | 10/2014 | Kowalchuk | ............ | A01C 7/088 |
| | | | | 701/32.4 |
| 2020/0166338 A1* | 5/2020 | Parés Calaf | ........... | G01C 15/06 |
| 2020/0245527 A1* | 8/2020 | Strnad | .................... | A01C 14/00 |

\* cited by examiner

*Primary Examiner* — James M McPherson
*Assistant Examiner* — Bakari Underwood
(74) *Attorney, Agent, or Firm* — Bradley Arant Boult Cummings; Alex H. Huffstutter

(57) ABSTRACT

A plant tracking apparatus, system, and method for tracking planting locations of a plurality of plants configured to be planted in a ground surface using a planting utensil having a handle, a blade, and a shaft defined between the handle and the blade is disclosed herein. The plant tracking apparatus includes a housing configured to be coupled to the planting utensil. The plant track apparatus further includes a Global Navigation Satellite System (GNSS) sensor, a planting sensor, and a controller positioned within or coupled to the housing. The controller is configured to record location data from the GNSS sensor in response to a planting signal from the planting sensor. In certain embodiments, the controller may determine the planting signal by comparing data from the planting sensor to a predetermined motion profile.

20 Claims, 8 Drawing Sheets

INTELLIGENT PLANTING APPARATUS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to intelligent planting apparatuses. More particularly, this invention pertains to an apparatus configured to track the planting locations of plants.

2. Description of the Prior Art

Planting utensils, such as dibble bars, hoe dads, shovels, and the like, are used to manually plant seedlings in non-rocky soil. Seedlings may include tree seedlings (e.g., saplings), shrub seedlings, and other plants. These planting utensils generally have a wedge-shaped blade that is inserted into the ground and rocked back and forth to create a V-shaped pocket for planting the seedling.

Tracking the planting locations of the seedlings can be a daunting task. Farmers rarely but sometimes follow behind the planter and manually measure the location of each planted seedling using expensive surveying equipment. This presents a huge burden on the farmer to collect and organize the planting location data.

BRIEF SUMMARY

An exemplary object of the present disclosure may be to provide an apparatus, system, and method for automatically tracking the planting location of each plant during the planting process. An exemplary such apparatus may feature a small battery-powered, micro-processor-based measuring device configured to be mounted on the planting utensil. The exemplary such apparatus may detect when the bar is inserted into the ground, measure the seedling or plant's global position and record that information. The exemplary such apparatus may also contemporaneously transmit or transmit at a later time that information to a cloud server application which will store the information and generate reports detailing information such as the position (planting location) of all of the seedlings or plants, total quantity of seedlings or plants and plant density planted on a site. This information may be very valuable for farmers in tracking planting efficiency as well as monitoring crop growth and loss over time.

In a particular embodiment, an exemplary apparatus as disclosed herein may preferably be configured to track planting locations of a plurality of plants configured to be planted in a ground surface using a planting utensil having a handle, a blade, and a shaft defined between the handle and the blade. The apparatus may include a housing, a Global Navigation Satellite System (GNSS) sensor, a triggering sensor, and a controller. The housing may be configured to be coupled to one of the handles or the shaft of the planting utensil. The GNSS sensor may be positioned within the housing and may further be configured to generate location data. The triggering sensor may be coupled to the housing and configured to generate a trigger signal in response to the blade of the planting utensil being inserted into the ground surface for planting one of the plurality of plants. The controller may be positioned within the housing and functionally linked to each of the GNSS sensor and the triggering sensor. The controller may further be configured to record the location data from the GNSS sensor in response to the trigger signal of the triggering sensor to define a recorded planting location of one of the plurality of plants.

In an exemplary aspect according to the above-referenced embodiment, the triggering sensor may comprise at least one of an accelerometers, a gyroscope, or a magnetometer positioned within the housing and functionally linked to the controller.

In another exemplary aspect according to the above-referenced embodiment, the controller may be configured to monitor data from each of the accelerometer, the gyroscope, or the magnetometer and compare the monitored data to a predetermined motion profile to identify the trigger signal.

In another exemplary aspect according to the above-referenced embodiment, the controller is configured to compare each recorded planting location of the plurality of plants, identify whether multiple recorded planting locations are positioned within a predetermined radius of each recorded planting location, and selectively filter the planting locations such that only one recorded planting location is saved within the predetermined radius.

In another exemplary aspect according to the above-referenced embodiment, the triggering sensor may comprise an actuator assembly configured to generate the trigger signal upon engagement of the actuator assembly. The actuator assembly may include at least a foot lever and an electronic switch configured to be selectively engaged by the foot lever for generating the trigger signal.

In another exemplary aspect according to the above-referenced embodiment, the apparatus may further comprise a communications module positioned within the housing and functionally linked to the controller. The communications module may be configured to transmit the recorded planting location of each of the plurality of plants to one or more of an external device or a cloud application.

In another exemplary aspect according to the above-referenced embodiment, the controller may be configured to store the recorded planting location of each of the plurality of plants until connection with one or more of the external device or the cloud application is established.

In another exemplary aspect according to the above-referenced embodiment, the controller may be configured to continually transmit the recorded planting location of each of the plurality of plants to one or more of the external device or the cloud application using the communications module.

In another exemplary aspect according to the above-referenced embodiment, the apparatus may further comprise an alerting device coupled to the housing and functionally linked to the controller. The alerting device may be configured to generate one or more of an audible sound or visual indicia in response to the trigger signal.

In another embodiment, a planting system for tracking planting locations for a plurality of plants to be planted is disclosed herein. The planting system may include a planting utensil, a housing, a GNSS sensor, a planting sensor, a controller, and a wireless transceiver. The planting utensil may include a handle, a blade, and a shaft defined between the handle and the blade. The housing may be coupled to one of the handle or the shaft of the planting utensil. The GNSS sensor may be positioned within the housing and may further be configured to monitor a Global Positioning System (GPS) location of the GNSS sensor. The planting sensor may be coupled to the housing and configured to generate a planting signal in response to inserting the blade of the planting utensil into a ground surface for planting one of the plurality of plants. The controller may be positioned within the housing and functionally linked to the GNSS sensor and the planting sensor. The controller may be configured to record the GPS location in response to the planting signal. The wireless transceiver may be positioned within the housing and functionally linked to the controller. The wireless transceiver may be configured to transmit the recorded GPS locations from the controller to one of an external device or a cloud application.

In an exemplary aspect according to the above-referenced embodiment, the planting sensor may comprise one or more of an accelerometer, a gyroscope, or a magnetometer positioned within the housing and functionally linked to the controller. The controller may be configured to monitor data from one or more of the accelerometer, the gyroscope, or the magnetometer and compare the monitored data to a predetermined motion profile to identify the planting signal.

In another exemplary aspect according to the above-referenced embodiment, the controller may be configured to compare the recorded GPS locations and eliminate any additional recorded GPS locations within a predetermined radius of one of the recorded GPS locations.

In another exemplary aspect according to the above-referenced embodiment, the planting sensor may comprise an actuator assembly configured to generate the planting signal upon engagement of the actuator assembly.

In a further embodiment, a method of planting and monitoring planting locations of a plurality of plants using a plant tracking apparatus is disclosed herein. The method may comprise (a) inserting a blade of a planting utensil in a ground surface; (b) recording a planting location of the planting utensil using a Global Navigation Satellite System (GNSS) sensor functionally linked to a controller of the plant tracking apparatus in response to inserting the blade into the ground surface; (c) planting one of the plurality of plants at the recorded planting location; and (d) transmitting the recorded planting location to one of an external device or a cloud application using a communications module of the plant tracking apparatus.

In an exemplary aspect according to the above-referenced embodiment, the method may further comprise, prior to step (b), comparing data from one or more movement sensors of the plant tracking apparatus to predetermined motion profile stored on the controller to identify when the blade of the planting utensil is inserted into the ground surface.

In another exemplary aspect according to the above-referenced embodiment, the method may further comprise engaging an actuator assembly of the plant tracking apparatus and in response thereto recording the planting location of the planting utensil.

In another exemplary aspect according to the above-referenced embodiment, the method may further comprise repeating steps (a) through (c) for each of the plurality of plants to define a plurality of recorded planting locations. In another exemplary aspect according to the above-referenced embodiment, the method may further comprise comparing each of the plurality of recorded planting locations and identifying overlapping recorded planting locations positioned within a predetermined radius of each of the plurality of recorded planting locations using the controller; and saving one of the overlapping recorded planting locations within the predetermined radius.

In another exemplary aspect according to the above-referenced embodiment, the method may further comprise associating each of the plurality of recorded planting locations with a timestamp.

In another exemplary aspect according to the above-referenced embodiment, the method may further comprise comparing each of the plurality of recorded planting locations and identifying overlapping recorded planting locations positioned within a predetermined radius of each of the plurality of recorded planting locations using the controller; and saving one of the overlapping recorded planting locations within the predetermined radius based on its associated timestamp.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
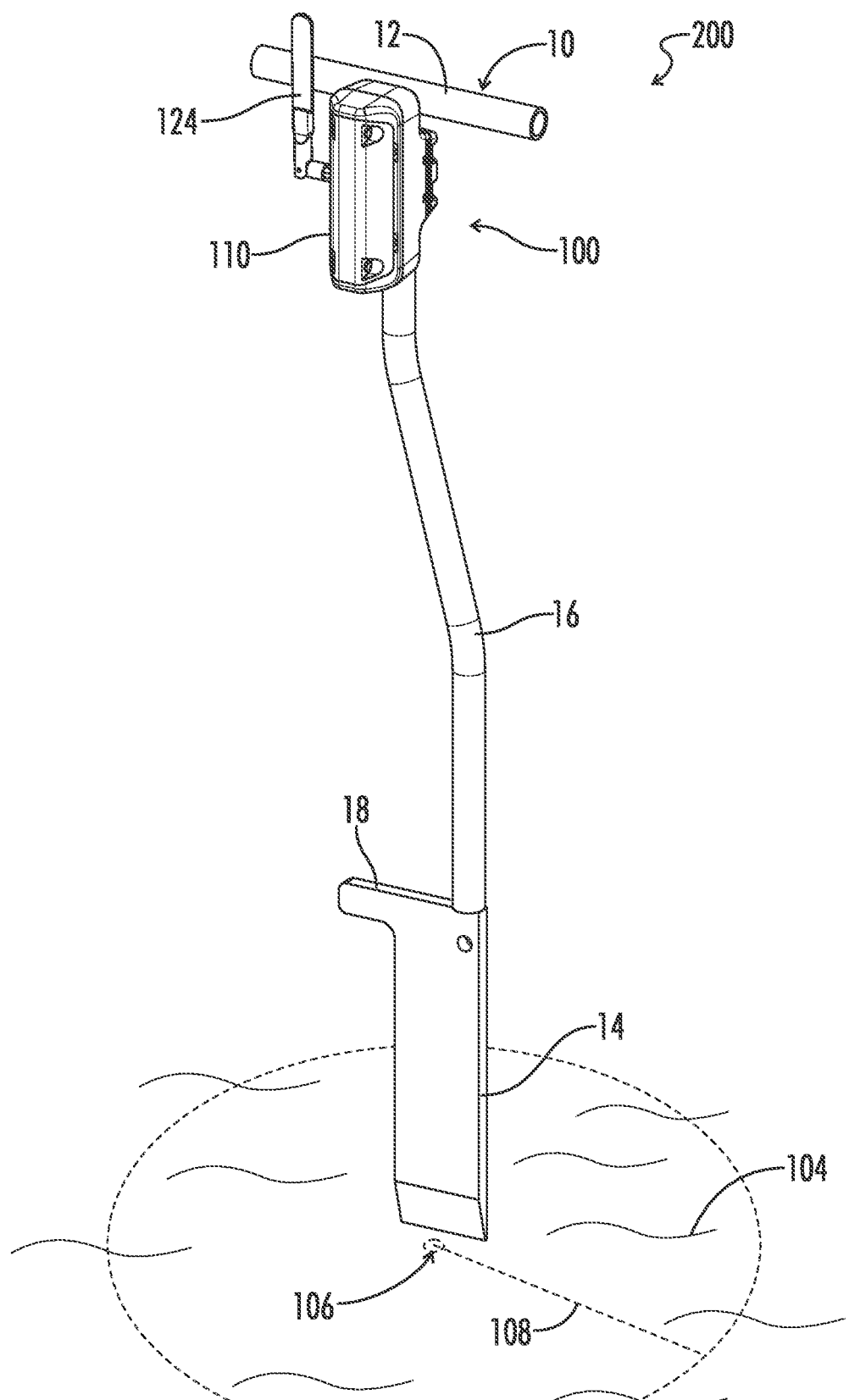
FIG. 1 is a perspective view of a planting system including a planting utensil and a plant tracking apparatus in accordance with the present disclosure.

Referring to FIG. 1, a plant tracking apparatus 100 coupled to a planting utensil 10 is shown. The combination of the of the plant tracking apparatus 100 coupled to the planting utensil 10 may be referred to herein as a planting system 200. The plant tracking apparatus 100 may be configured for tracking planting locations of a plurality of plants 102 (shown in FIG. 8) which are configured to be planted in a ground surface 104. The plant tracking apparatus 100 may also be referred to herein as an apparatus 100. The planting utensil 10 may be a shovel, dibble bar, hoe dad, or the like. As illustrated, the planting utensil 10 is a dibble bar. The planting utensil 10 may include a handle 12, a blade 14, and a shaft 16 defined between the handle 12 and the blade 14.

Figure 2:
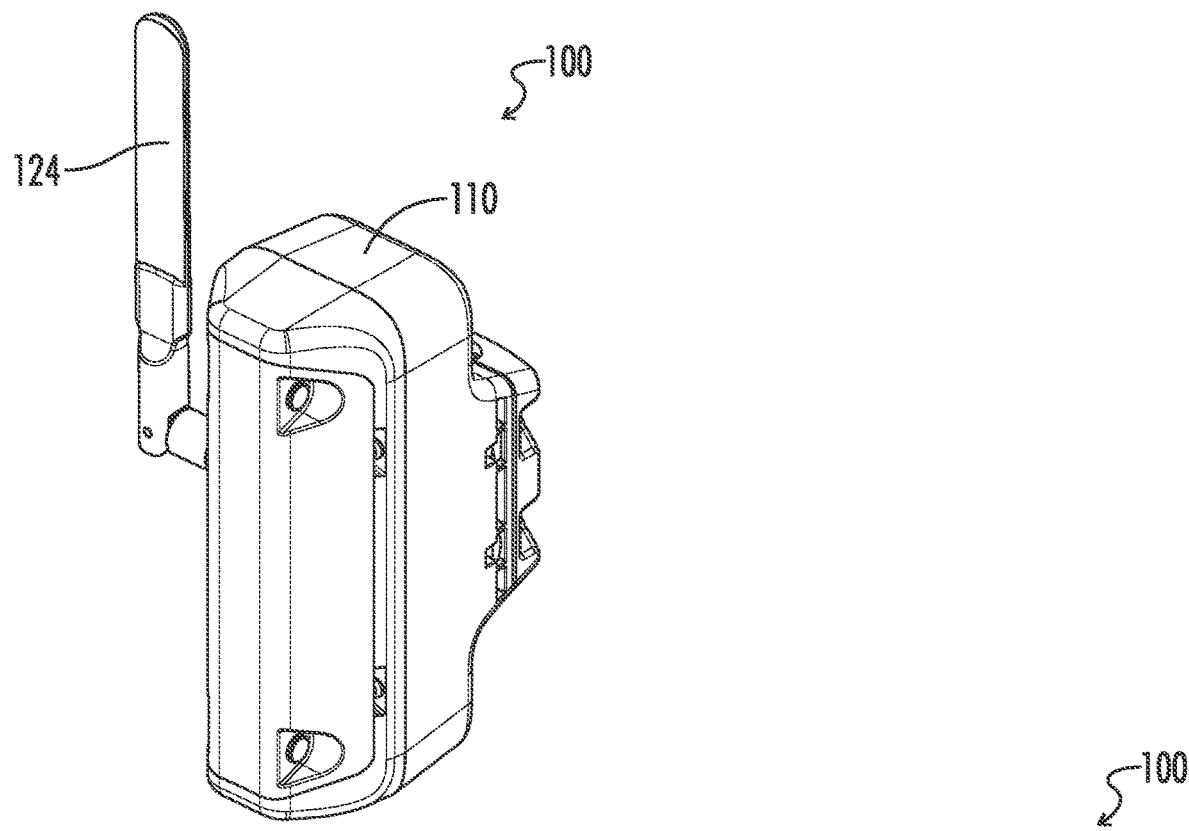
FIG. 2 is a front perspective view of the plant tracking apparatus of FIG. 1 in accordance with the present disclosure.
Figure 3:
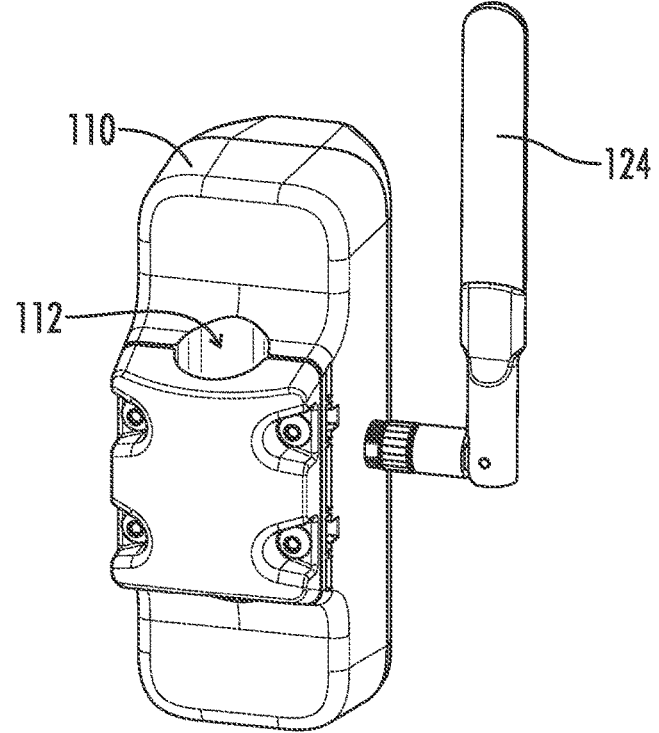
FIG. 3 is a rear perspective view of the plant tracking apparatus of FIG. 1 in accordance with the present disclosure.

Referring to FIGS. 1-3, the plant tracking apparatus 100 may include a housing 110 configured to be coupled to one of the handle 12 of the planting utensil 10 or the shaft 16 of the planting utensil 10. As illustrated in FIG. 3, the housing 110 may include a clampable passageway 112 for removably receiving the shaft 16 of the planting utensil 10 proximate the handle 12. The housing 110 may be waterproof in order to provide environmental protection for the internal components.

Figure 4:
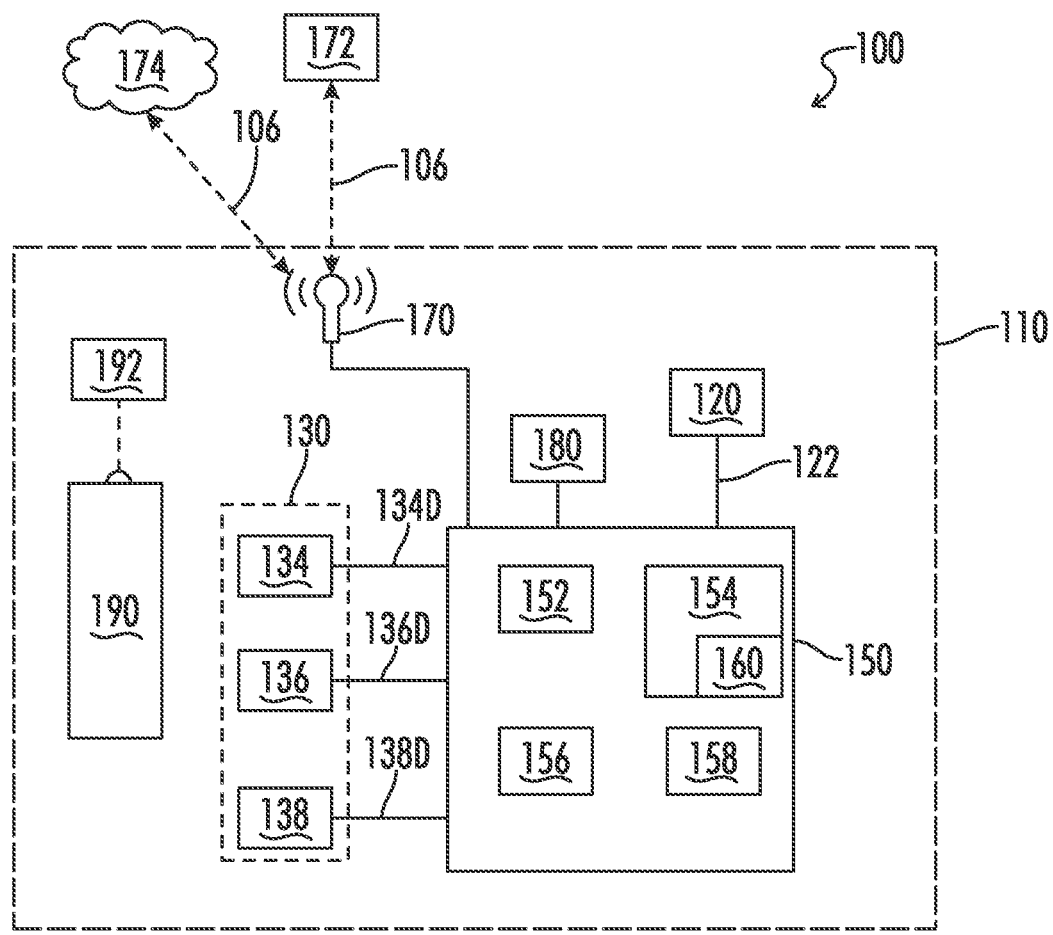
FIG. 4 is a schematic diagram of the controller and related components of the plant tracking apparatus of FIG. 1 in accordance with the present disclosure.

Referring to FIG. 4, the plant tracking apparatus 100 may further include a Global Navigation Satellite System (GNSS) sensor 120 positioned within the housing 110. A Global Navigation Satellite System (GNSS) may encompass the different satellite constellations such as GPS, GLONASS, BeiDou and Galileo. The GNSS sensor 120 is configured to receive GNSS signals and will process this data to determine its current location (e.g., generate location data 122). The location data 122 may also be referred to herein as a Global Positioning System (GPS) location 122 or a global position 122 of the GNSS sensor 120. The GNSS sensor 120 may include a built-in antenna (not shown) and/or an external antenna 124 in order to provide signal strength. The GNSS sensor 120 may also include an amplifier (not shown) to amplify weak signals.

The plant tracking apparatus 100 may further include a planting sensor 130 coupled to the housing 110. The planting sensor 130 may also be referred to herein as a trigger sensor 130 or a movement sensor 130. The planting sensor 130 may be configured to generate a planting signal 132 in response to the blade 14 of the planting utensil 10 being inserted into the ground surface 104 for planting one of the plurality plants 102. The planting signal 132 may also be referred to herein as a trigger signal 132.

The plant tracking apparatus 100 may still further include a controller 150 positioned within the housing 110 and functionally linked to each of the GNSS sensor 120 and the planting sensor 130. The controller 150 may be configured to record the location data 122 from the GNSS sensor 120 in response to the planting signal 132 from the planting sensor 130 to define a recorded planting location 106 of one of the plurality of plants 102. Once the plurality of plants 102 are planted using the plant tracking apparatus 100, the recorded planting location 106 may also be referred to here as a plurality of recorded planting locations 106 or recorded planting locations 106.

The controller 150 may continually monitor the location data 122 of the GNSS sensor 120 and the planting signal 132 of the planting sensor 130. Controller 150 includes or may be associated with a processor 152, a computer readable medium 154, and a data base 156. The computer readable medium 154 may be non-volatile memory which may be used for storage of the collected data, system settings and temporary storage for system software updates. The computer readable medium 154 is not effected by loss of power. Accordingly, the plant tracking apparatus 100 may store the recorded data (e.g., the recorded planting locations 106) until it can be uploaded if an active connection cannot be established/maintained during the planting session.

It is understood that the controller 150, described herein, may be a single controller having all of the described functionality, or it may include multiple controllers wherein the described functionality is distributed among the multiple controllers.

Various operations, steps or algorithms as described in connection with the controller 150 can be embodied directly in hardware, in a computer program product 158 such as a software module executed by the processor 152, or in a combination of the two. The computer program product 158 can reside in RAM memory, flash memory, ROM memory, EPROM memory, EEPROM memory, registers, hard disk, a removable disk, or any other form of computer-readable medium 154 known in the art. An exemplary computer-readable medium 154 can be coupled to the processor 152 such that the processor 152 can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The computer program product 158 may, for example, compare each point recorded (e.g., the recorded planting locations 106) against other points stored in its memory and identify whether any other point(s) has been saved within a preset or predetermined radius 108. The computer program product 158 may selectively filter and save the plurality of recorded planting locations 106 such that only one recorded planting location is saved within its predetermined radius 108. If not, the point is stored, otherwise, it is ignored (or deleted). The predetermined radius 108 may, for example, be three (3) feet or any other distance specified by the controller or set by the user. This step will provide a very clean data set for the post processing by the external device 172 or the cloud application 174.

In certain optional embodiments, an algorithm of the computer program product 158 may use a combination of time data and location data 122 to determine the difference between the planting utensil 10 being inserted in the ground surface 104 multiple times to plant a single plant versus multiple plants being planted in too-close proximity. For instance, if the plant tracking apparatus 100 identifies a plant in row two is within the predetermined radius 108 to a plant in row one, then the information would be kept based on at least a time disparity between the recorded planting locations of the plurality of planting locations 106. Alternatively, if multiple recorded planting locations were saved within a very short time window, then the computer program product 158 may determine which of the planting locations to save based on an average spacing between the plurality of planting locations 106 or at least one of the immediately proceeding planting locations of the plurality of planting locations 106 or the immediately following planting locations of the plurality of planting locations 106.

The GNSS sensor 120 inside the apparatus may receive real time kinematic (RTK) corrections from one or multiple sensors mounted in a fixed position within a close proximity to the planting location. That sensor will be receiving RTK corrections from one or multiple satellites, constellations, web-based services, cellular connection, WIFI, or the like, which may greatly improve the accuracy of the location data 122 being recorded.

Once the planting has been completed for the day, all of the recorded data may be uploaded to the external device 172 or the cloud application 174, that will again check or filter all points recorded (e.g., the recorded planting locations 106) and will check for multiples within a given area. If multiples are found, the external device 172 or the cloud application 174 will filter the extra points out by determining the central or average point of the multiples. These algorithms will be tunable by parameters in the controller 150, the external device 172, or the cloud application 174 for providing the best and most accurate planting data.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration. For example, the processor can be implemented as a microprocessor-based computer running an operating system such as Linux and the processor may be an ARM, RISC, SPARC, x86 or the like.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Referring to FIG. 4, the planting sensor 130 of the plant tracking apparatus 100 may comprise one or more of an accelerometer 134, a gyroscope 136, or a magnetometer 138 positioned within the housing 110 and functionally linked to the controller 150 for detecting the motion and orientation of the housing 110, or more particularly, the planting utensil 10 to which the housing 110 is configured to be attached to. Two or more of the accelerometer 134, the gyroscope 136, or the magnetometer 138 may be combined or grouped together in a single chip or module called an internal measurement unit (IMU). The controller 150 may be configured to monitor data 134D, 136D, 138D from each of the accelerometer 134, the gyroscope 136, or the magnetometer 138, respectively, and compare the monitored data 134D, 136D, 138D to a predetermined motion profile 160 stored in the computer readable medium 154 of the controller 150 to identify the planting signal 132.

The predetermined motion profile 160 may be associated with physical motions of the planting utensil 10 associated with planting the plurality of plants 102. The accelerometer 134 may, for example, be used to measure acceleration of linear motion and to detect the quick downward motion associated with inserting the planting utensil 10 into the ground surface 104. The gyroscope 136 may, for example, be used to measure rotational motion generally associated with the rocking back and forth motion of the planting utensil 10 when spreading open the ground surface 104 to create the hole for planting one of the plurality of plants 102.

The controller 150 may constantly monitor data 134D, 136D, 138D from each of the accelerometer 134, the gyroscope 136, or the magnetometer 138, respectively, a sequence of events generally associated with the predetermined motion profile 160, namely, a quick downward motion followed by a rocking back and forth motion. The controller 150 may identify the planting signal 132 when the data 134D, 136D, 138D from each of the accelerometer 134, the gyroscope 136, or the magnetometer 138, respectively, aligns with the predetermined motion profile 160 and in response thereto record the associated location data 122 from the GNSS sensor 120.

In order to improve the accuracy of the recorded planting location 106, the controller 150 may, while the planting utensil 10 is rocking back and forth, monitor the location data 122 along with the orientation of the planting utensil 10 to selectively record the location data 122 when the planting utensil 10 is standing vertical.

Figure 5:
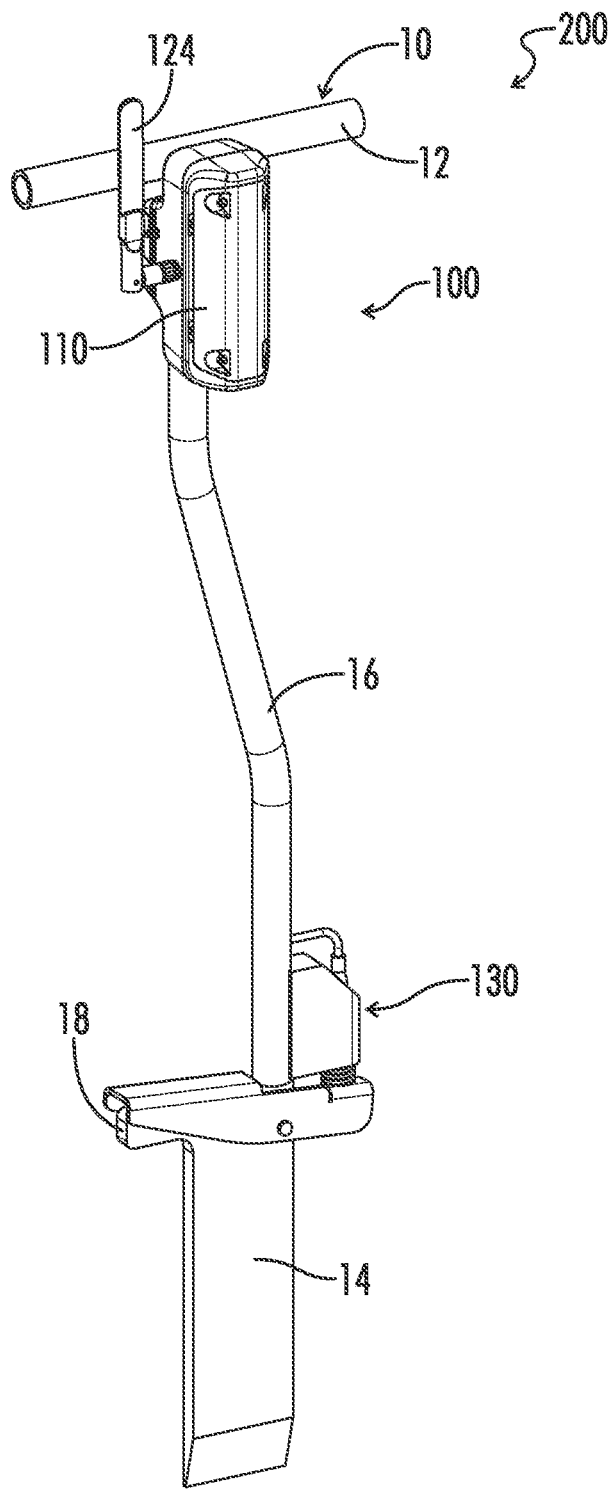
FIG. 5 is a perspective view of the plant tracking apparatus of FIG. 1 further including an actuator assembly in accordance with the present disclosure.
Figure 6:
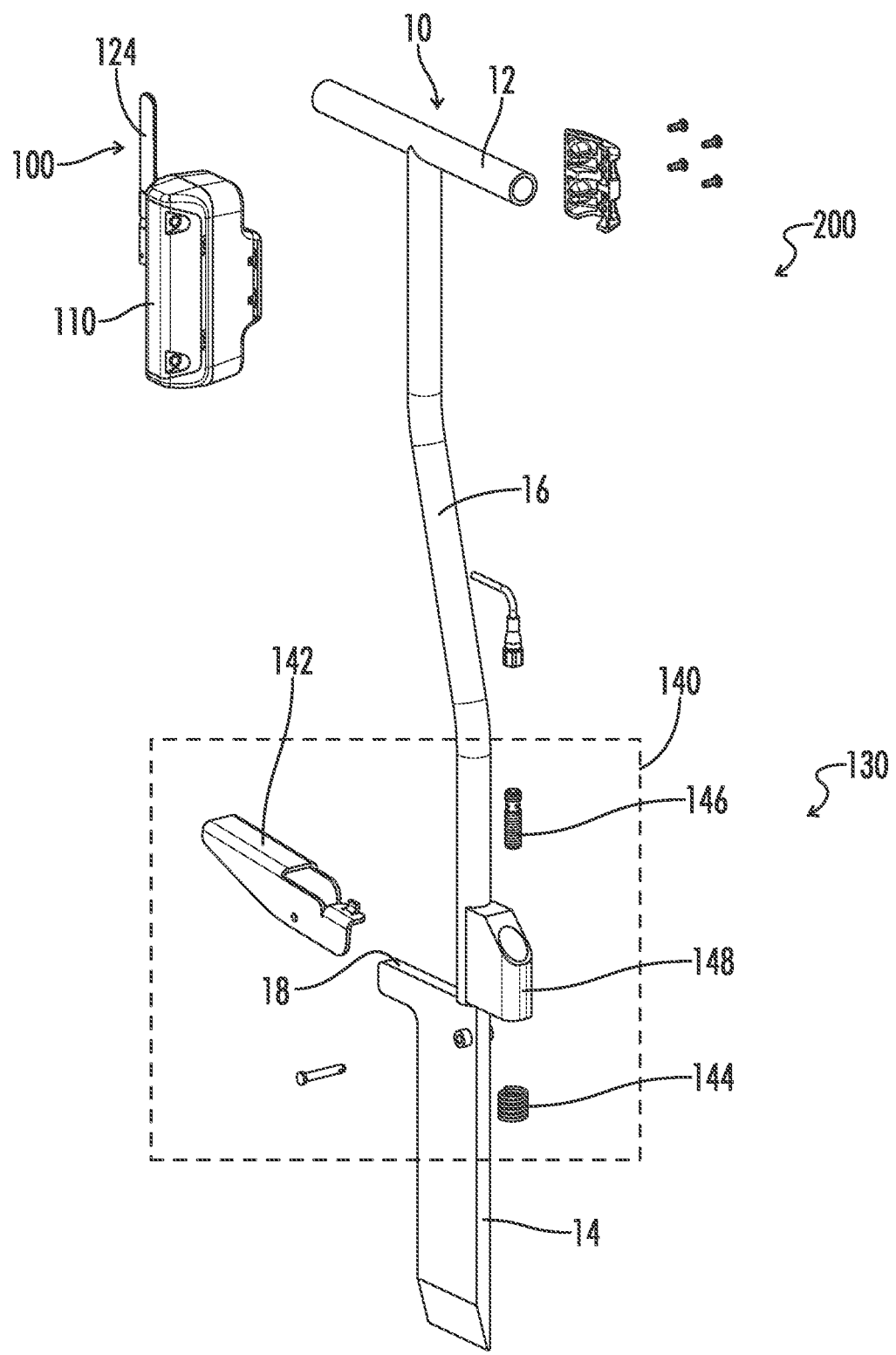
FIG. 6 is an exploded perspective view of the plant tracking apparatus of FIG. 5 in accordance with the present disclosure.
Figure 7:
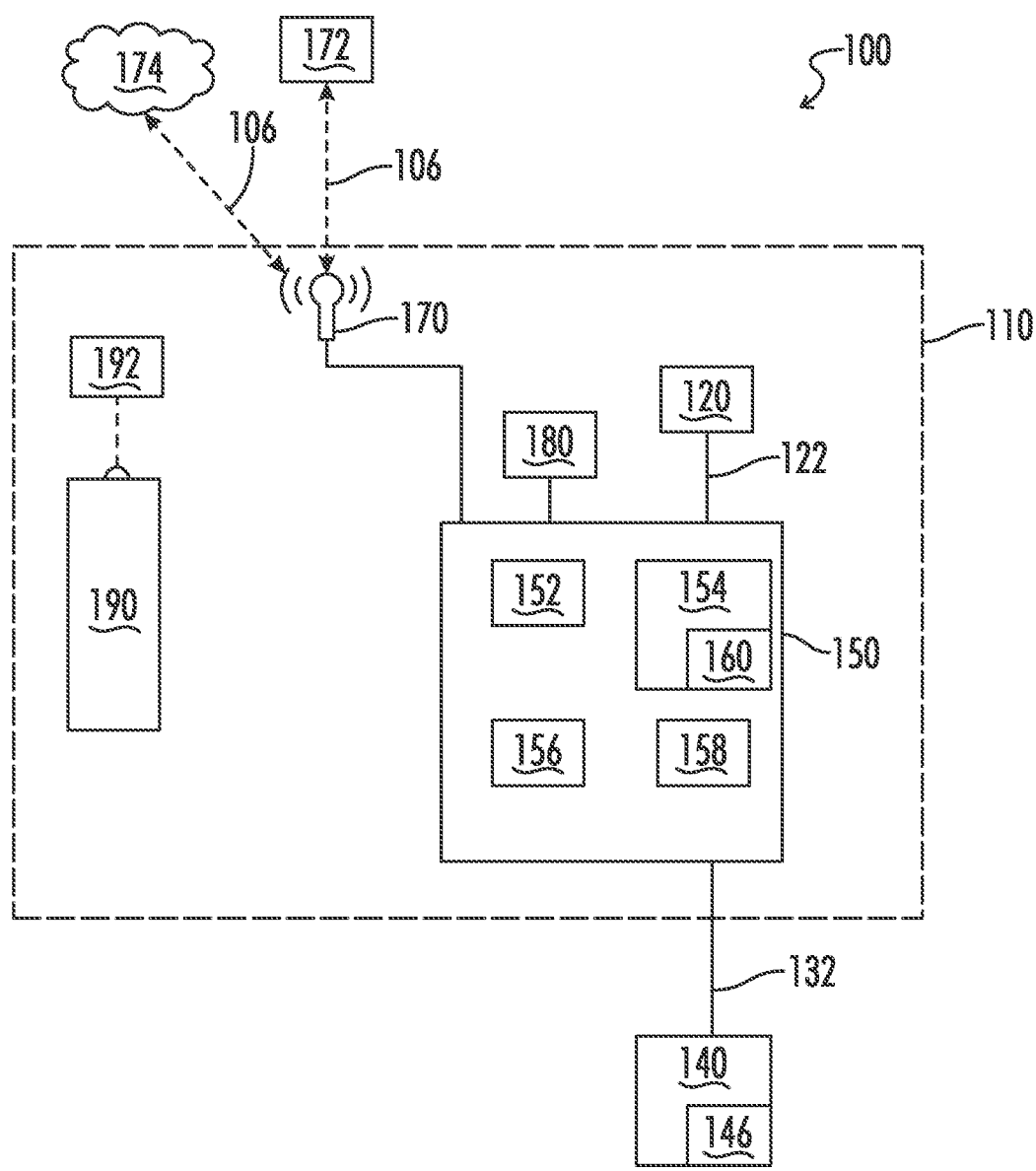
FIG. 7 is a schematic diagram of the controller and related components of the plant tracking apparatus of FIG. 5 in accordance with the present disclosure.

Referring to FIGS. 5-7, the planting sensor 130 of the plant tracking apparatus 100 may comprise an actuator assembly 140 configured to generate the planting signal 132 upon engagement of the actuator assembly 140. The actuator assembly 140 may be used instead of or in addition to the one or more of the accelerometer 134, the gyroscope 136, or the magnetometer 138 when a point needs to be recorded as a recorded planting location 106.

The actuator assembly 140 may include a foot lever 142 configured to be pivotally coupled to the planting utensil 10 and positioned above a footrest 18 of the planting utensil 10. The foot lever 142 may be made from plastic or metal and may be attached to the planting utensil using a pivot pin. The foot lever 142 may be easily removable, via the pivot pin, for cleaning and/or replacement. The foot lever 142 may be designed to provide a more ergonomic platform for the operator's foot which could limit stress on the foot to provide for a more comfortable operation.

The actuator assembly 140 may further include a spring 144 configured to bias the foot lever 142 towards an unactuated position. The actuator assembly 140 may still further include an electronic switch 146 functionally linked to the controller 150 and configured to generate the planting signal 132 when the foot lever 142 is moved to an actuated position. The electronic switch 146 may be positioned within a protective housing 148 configured to be coupled to the planting utensil 10. In certain optional embodiments, the electronic switch 146 may be protected by recessing and possibly potting into the shaft 16 of the planting utensil 10 to protect it from moisture and abuse.

The plant tracking apparatus 100 may further include a communications module 170 positioned within the housing 110 and functionally linked to the controller 150. In certain optional embodiments, the communications module 170 may be integral with the controller 150. The communications module 170 may also be referred to herein as a transmitter 170 or a wireless transceiver 170. The communications module 170 may be configured to transmit the plurality of recorded planting locations 106 to an external device 172 or a cloud application 174 using, for example, radio frequency (RF), Bluetooth, Bluetooth Low Energy, WiFi, Cellular, or other similar communication technologies (collectively referred to as communication protocols). In certain optional embodiments, the communications module 170 may be configured to implements multiple communication protocols using a single communications module 170. In other optional embodiments, the communications module 170 may include multiple communications modules, each configured to implement a different communication protocol. The external device 172 may, for example, be a smartphone, a computer, a server, or the like.

The controller 150 may be utilized its computer readable medium 154 to store the plurality of recorded planting locations 106 until connection with one or more of the external device 172 or the cloud application 174 can be established. Alternatively, the controller 150 may be configured to continually transmit each of the plurality of recorded planting locations 106 to the external device 172 or the cloud application 174 using the communications module 170.

The communication module 170 may consist of one or multiple communication protocols combined into a single package or several modules each supporting one protocol. Independent of the type of communication protocol, the communication module 170 may be utilized to transmit data between the controller 150 and either the external device 172 or the cloud application 174. The communication module 170 may also be used to monitor and adjust settings in the controller 150 as well as for firmware upgrades.

The plant tracking apparatus 100 may further include an altering device 180 coupled to the housing 110 and functionally linked to the controller 150. The alerting device 180 may be configured to generate one or more of an audible sound (not shown) or visual indicia (not shown) in response to the planting signal 132, or more particularly, when a point has been recorded by the controller 150 as a recorded planting location 106. The visual indicia may, for example, be a flash of light from one or more light emitting diodes (LEDs) visible on the housing 110. The audible sound may, for example, be a short beep from a speaker positioned within the housing 110.

The plant tracking apparatus 100 may still further include a at least one battery 190 configured to supply power to each of the GNSS sensor 120, the planting sensor 130, the controller 150, the communications module 170, and/or the alerting device 180. The at least one battery 190 may be a primary single use battery or a secondary rechargeable battery.

The plant tracking apparatus 100 may include a power supply circuit 192 configured to regulate the power supplied by the at least one battery 190. In certain optional embodiments, a charging circuit (not shown) may be included to provide a means to charge the at least one battery 190 (e.g., a rechargeable battery) by plugging the charging circuit into a power source.

The plant tracking apparatus 100 may further include a USB port (not shown) functionally linked to the controller 150. The USB port may be used for troubleshooting, firmware upgrades and a backup means for downloading the data (e.g., the recorded planting locations 106) from the plant tracking apparatus 100, for example, in the event said data cannot be transferred by other means. In certain optional embodiments, the USB port may also be used for charging the at least one battery 190.

Each of the GNSS sensor 120, the planting sensor 130, the controller 150, the communications module 170, the alerting device 180 and/or power supply circuit 192 may be mounted on one or more printed circuit boards (not shown).

Figure 8:
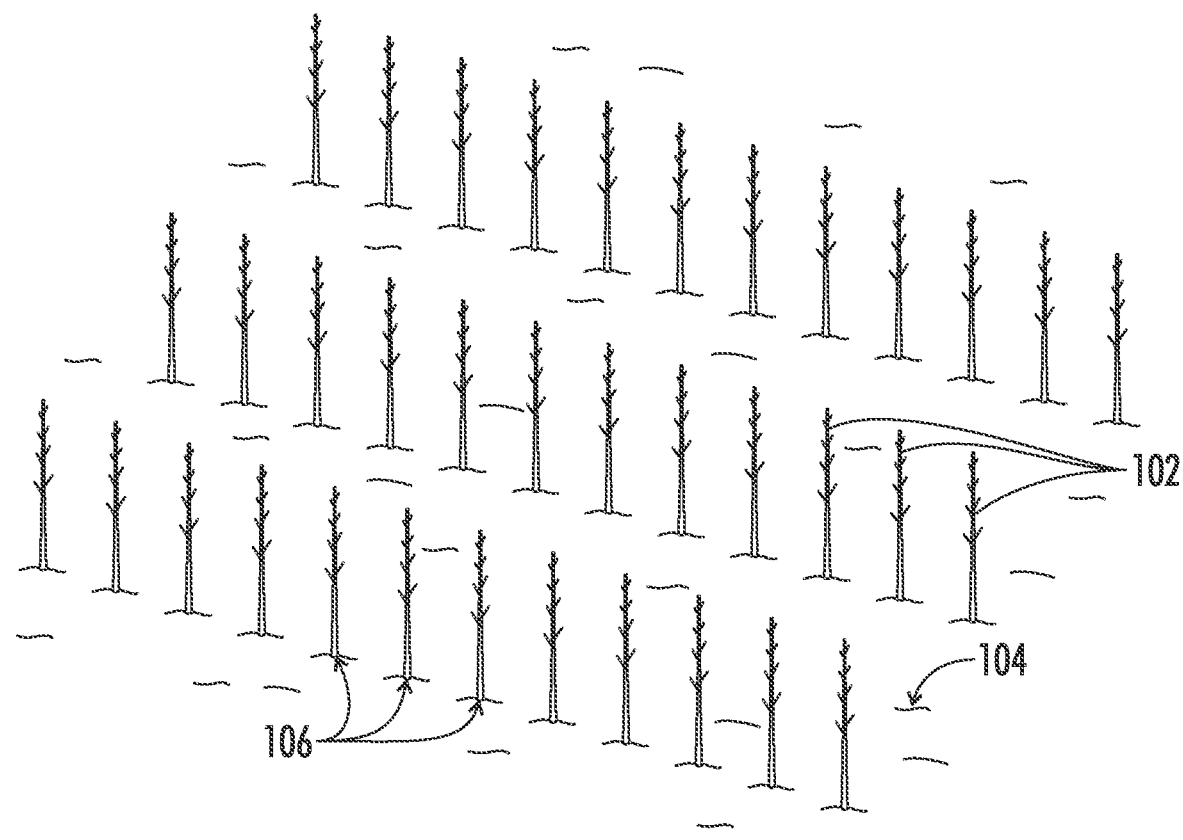
FIG. 8 is a perspective view of a plurality of plants planted at planting locations in a ground surface in accordance with the present disclosure.

Referring to FIG. 8, an exemplary embodiment of the plurality of plants 102, the ground surface 104, and the plurality of planting locations 106 is shown.

Figure 9:
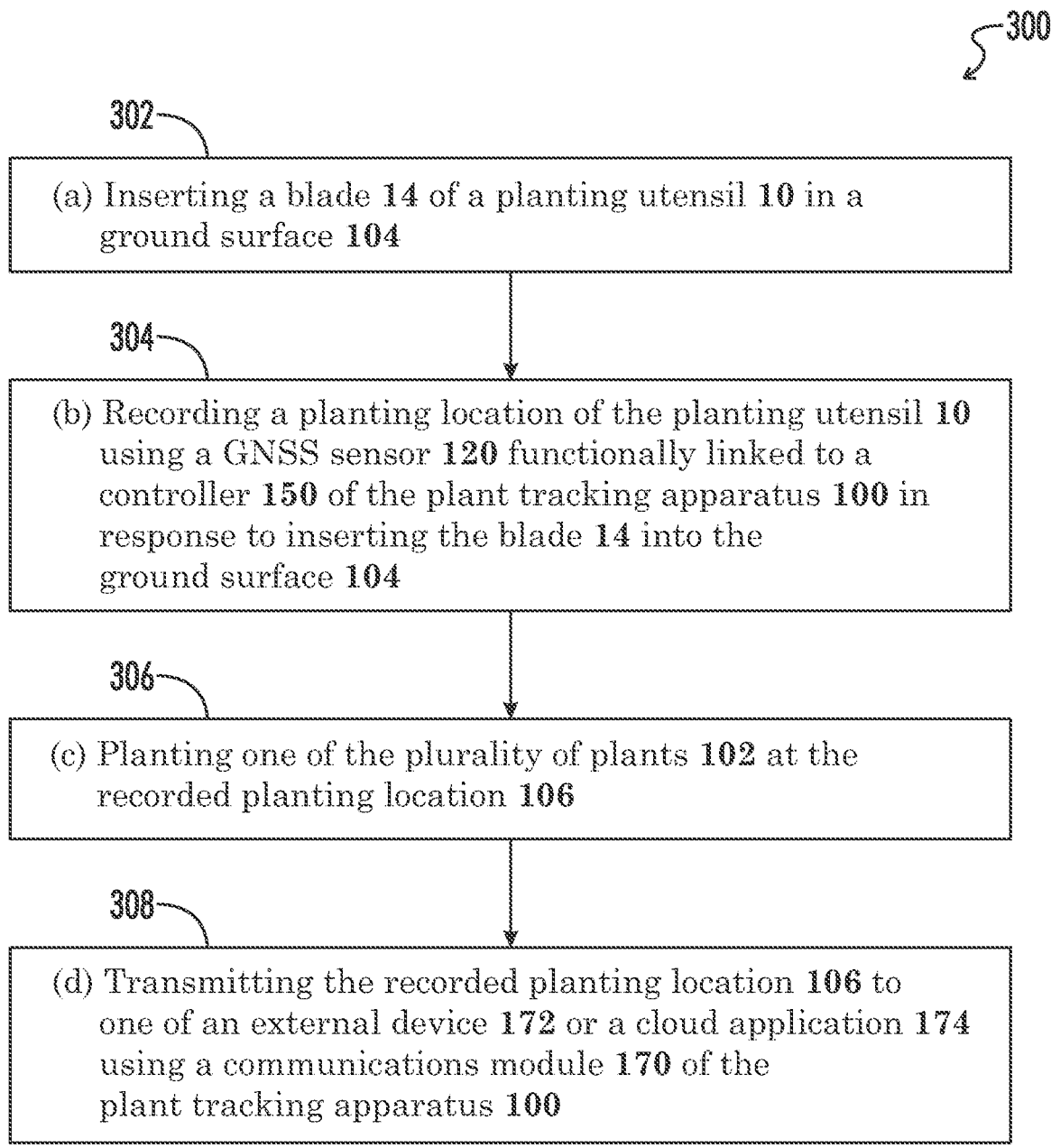
FIG. 9 is a flow chart of a method of planting and monitoring planting locations of a plurality of plants using a plant tracking apparatus in accordance with the present disclosure.

Referring to FIG. 9, a method 300 of planting and monitoring planting locations of a plurality of plants 102 using a plant tracking apparatus 100 is shown. The method 300 may comprise step (a) inserting 302 a blade 14 of a planting utensil 10 in a ground surface 104. The method 300 may further comprise step (b) recording 304 a planting location of the planting utensil 10 using a GNSS sensor 120 functionally linked to a controller 150 of the plant tracking apparatus 100 in response to inserting the blade 14 into the ground surface 104. The method 300 may further comprise step (c) planting 306 one of the plurality of plants 102 at the recorded planting location 106. The method 300 may further comprise step (d) transmitting 308 the recorded planting location 106 to one of an external device 172 or a cloud application 174 using a communications module 170 of the plant tracking apparatus 100.

In certain optional embodiments, the method 300 may further comprise, prior to step (b), comparing data 134D, 136D, 138D from one or more planting sensors 130 of the plant tracking apparatus 100 to predetermined motion profile 160 stored on the controller 150 to identify when the blade 14 of the planting utensil 10 is inserted into the ground surface 104.

In other optional embodiments, the method 300 may further comprise repeating steps (a) through (c) for each of the plurality of plants 102 to defined a plurality of recorded planting locations 106.

In additional optional embodiments, the method 300 may further comprise associating each of the plurality of recorded planting locations 106 with a timestamp.

In still further optional embodiments, the method 300 may further comprise comparing each of the plurality of recorded planting locations 106 and identifying overlapping recorded planting locations positioned within a predetermined radius 108 of each of the plurality of recorded planting locations 106 using the controller 150; and saving one of the overlapping recorded planting locations within the predetermined radius 108. In other optional embodiments, the saved one of the overlapping recoded planting locations may be based on its associated timestamp.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An apparatus for tracking planting locations of a plurality of plants configured to be planted in a ground surface using a handheld planting utensil having a handle, a blade, and a shaft defined between the handle and the blade, the apparatus comprising:
    a housing configured to be coupled to one of the handle or the shaft of the handheld planting utensil;
    a Global Navigation Satellite System (GNSS) sensor positioned within the housing, the GNSS sensor configured to generate location data;
    a triggering sensor coupled to the housing and configured to generate a trigger signal in response to motion of the housing corresponding at least in part to the blade of the handheld planting utensil being inserted into the ground surface for planting one of the plurality of plants; and
    a controller positioned within the housing and functionally linked to each of the GNSS sensor and the triggering sensor, the controller configured to record the location data from the GNSS sensor in response to the trigger signal of the triggering sensor to define a recorded planting location of one of the plurality of plants.

2. The apparatus of claim 1, wherein:
    the triggering sensor comprises at least one of an accelerometer, a gyroscope, or a magnetometer positioned within the housing and functionally linked to the controller.

3. The apparatus of claim 2, wherein:
    the controller is configured to monitor data from each of the accelerometer, the gyroscope, or the magnetometer and compare the monitored data to a predetermined motion profile to identify the trigger signal.

4. The apparatus of claim 1, wherein:
the controller is configured to compare each recorded planting location of the plurality of plants, identify whether multiple recorded planting locations are positioned within a predetermined radius of each recorded planting location, and selectively filter the planting locations such that only one recorded planting location is saved within the predetermined radius.

5. The apparatus of claim 1, wherein:
the triggering sensor comprises an actuator assembly configured to generate the trigger signal upon engagement of the actuator assembly; and
the actuator assembly includes at least a foot lever and an electronic switch configured to be selectively engaged by the foot lever for generating the trigger signal.

6. The apparatus of claim 1, further comprising:
a communications module positioned within the housing and functionally linked to the controller, the communications module configured to transmit the recorded planting location of each of the plurality of plants to one or more of an external device or a cloud application.

7. The apparatus of claim 6, wherein:
the controller is configured to store the recorded planting location of each of the plurality of plants until connection with one or more of the external device or the cloud application is established.

8. The apparatus of claim 6, wherein:
the controller is configured to continually transmit the recorded planting location of each of the plurality of plants to one or more of the external device or the cloud application using the communications module.

9. The apparatus of claim 1, further comprising:
an alerting device coupled to the housing and functionally linked to the controller, the alerting device configured to generate one or more of an audible sound or visual indicia in response to the trigger signal.

10. A planting system for tracking planting locations for a plurality of plants to be planted, the planting system comprising:
a handheld planting utensil having a handle, a blade, and a shaft defined between the handle and the blade;
a housing coupled to one of the handle or the shaft of the handheld planting utensil;
a Global Navigation Satellite System (GNSS) sensor positioned within the housing, the GNSS sensor configured to monitor a Global Positioning System (GPS) location of the GNSS sensor;
a planting sensor coupled to the housing and configured to generate a planting signal in response to inserting the blade of the handheld planting utensil into a ground surface for planting one of the plurality of plants;
a controller positioned within the housing and functionally linked to the GNSS sensor and the planting sensor, the controller configured to record the GPS location in response to the planting signal; and
a wireless transceiver positioned within the housing and functionally linked to the controller, the wireless transceiver configured to transmit the recorded GPS locations from the controller to one of an external device or a cloud application.

11. The planting system of claim 10, wherein:
the planting sensor comprises one or more of an accelerometer, a gyroscope, or a magnetometer positioned within the housing and functionally linked to the controller; and
the controller is configured to monitor data from one or more of the accelerometer, the gyroscope, or the magnetometer and compare the monitored data to a predetermined motion profile to identify the planting signal.

12. The planting system of claim 10, wherein:
the controller is configured to compare the recorded GPS locations and eliminate any additional recorded GPS locations within a predetermined radius of one of the recorded GPS locations.

13. The planting system of claim 10, wherein:
the planting sensor comprises an actuator assembly configured to generate the planting signal upon engagement of the actuator assembly.

14. A method of planting and monitoring planting locations of a plurality of plants using a plant tracking apparatus, the method comprising:
(a) inserting a blade of a handheld planting utensil in a ground surface;
(b) recording a planting location of the handheld planting utensil in response to inserting the blade into the ground surface using a Global Navigation Satellite System (GNSS) sensor functionally linked to a controller of the plant tracking apparatus;
(c) planting one of the plurality of plants at the recorded planting location; and
(d) transmitting the recorded planting location to one of an external device or a cloud application using a communications module of the plant tracking apparatus.

15. The method of claim 14, further comprising:
prior to step (b), comparing data from one or more movement sensors of the plant tracking apparatus to predetermined motion profile stored on the controller to identify when the blade of the handheld planting utensil is inserted into the ground surface.

16. The method of claim 14, further comprising:
engaging an actuator assembly of the plant tracking apparatus and in response thereto recording the planting location of the handheld planting utensil.

17. The method of claim 14, further comprising:
repeating steps (a) through (c) for each of the plurality of plants to define a plurality of recorded planting locations.

18. The method of claim 17, further comprising:
comparing each of the plurality of recorded planting locations and identifying overlapping recorded planting locations positioned within a predetermined radius of each of the plurality of recorded planting locations using the controller; and
saving one of the overlapping recorded planting locations within the predetermined radius.

19. The method of claim 17, further comprising:
associating each of the plurality of recorded planting locations with a timestamp.

20. The method of claim 19, further comprising:
comparing each of the plurality of recorded planting locations and identifying overlapping recorded planting locations positioned within a predetermined radius of each of the plurality of recorded planting locations using the controller; and
saving one of the overlapping recorded planting locations within the predetermined radius based on its associated timestamp.

* * * * *